United States Patent [19]

Mochida

[11] 4,454,736

[45] Jun. 19, 1984

[54] CYLINDER LOCK

[75] Inventor: Haruo Mochida, Yokohama, Japan

[73] Assignee: Nissan Motor Co., Ltd., Kanagawa, Japan

[21] Appl. No.: 305,780

[22] Filed: Sep. 25, 1981

[30] Foreign Application Priority Data

Sep. 26, 1980 [JP] Japan .................. 55-134806

[51] Int. Cl.³ .................. E05B 15/16; E05B 63/00
[52] U.S. Cl. .................. 70/422
[58] Field of Search .................. 70/422, 416, 418, 419, 70/1.5, 417

[56] References Cited

U.S. PATENT DOCUMENTS 1,705,344  3/1929  Thompson .
1,705,364  3/1929  Heyer .................. 70/422
3,142,168  7/1964  Wellekens .................. 70/419
4,231,244  11/1980  Krügener et al. .................. 70/422

Primary Examiner—Gary L. Smith
Assistant Examiner—Lloyd A. Gall
Attorney, Agent, or Firm—Lowe, King, Price & Becker

[57] ABSTRACT

A cylinder lock is provided with means for preventing a cylinder from being extracted to improve safety against breakage of the lock. The preventing means comprises a deformable portion formed at an entrance of a keyhole of the cylinder and deformable into a radially expanded form when a force is applied to forcibly insert some object other than a correct key into the keyhole, and a stop portion formed in a casing of the cylinder lock for preventing the deformable portion in the deformed form from being extracted.

4 Claims, 6 Drawing Figures

CYLINDER LOCK

BACKGROUND OF THE INVENTION

The present invention relates to a cylinder lock and, more particularly, to a cylinder lock having deformable means preventing extraction of the cylinder during theft attempts.

It is common to manufacture different types of cylinder locks by changing the lengths of tumbler pins and their combination, thereby making it difficult to prepare a duplicate key to prevent theft. Thus due to their reliability and elaborate construction, cylinder locks are widely used. However, since these locks are elaborate, they tend to be mechanically weak and liable to be broken without a duplicate key.

SUMMARY OF THE INVENTION

It is an object of the present invention to provide a cylinder lock having an improved antitheft effectiveness.

A cylinder of a cylinder lock has a keyhole and is rotatably received in a bore formed in a casing. The cylinder is connected to the casing by a tumbler mechanism which allows the cylinder to rotate only when a correct key is inserted into the keyhole. Rotational movement of the cylinder actuates actuating means causing locking action of the cylinder lock. According to the present invention, the cylinder includes, at the keyhole entrance, a deformable portion having an insertion hole through which a key is inserted into the keyhole. The portion is deformable into a radially expanded form when an incorrect key or object is forcibly inserted through the insertion hole into the keyhole. The casing includes a stop portion which comes into contact with the deformable portion deformed into radially expanded form when the cylinder is pulled outwardly, to prevent extraction thereof.

Preferably, the deformable portion includes plurality of slits disposed radially around the insertion hole and cut axially from an outer end of said deformable portion to some depth so that the deformable portion is divided into plural axially extending sections radially disposed around the insertion hole. Preferably, the deformable portion includes a circumferential groove surrounding the insertion hole so that the slits extend axially to the groove. The stop portion preferably surrounds the deformable portion and has an opening facing the keyhole and insertion hole, and an inward projection restricting the opening so that the deformable portion can not pass through the opening when in radially expanded form.

DETAILED DESCRIPTION OF THE INVENTION

Figure 1:
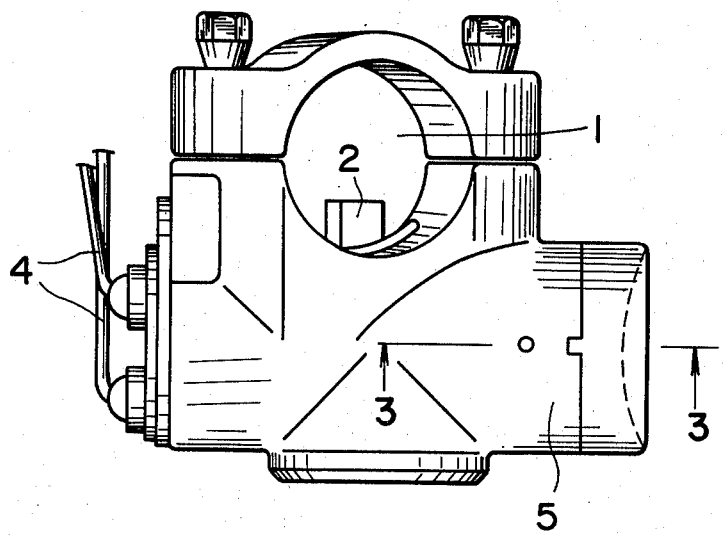
FIG. 1 is a front view showing an automobile steering lock combined with an ignition switch to which the present invention is applied.
Figure 2:
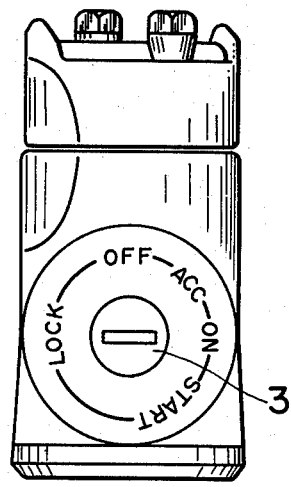
FIG. 2 is a right side view of the steering lock of FIG. 1.
Figure 3:
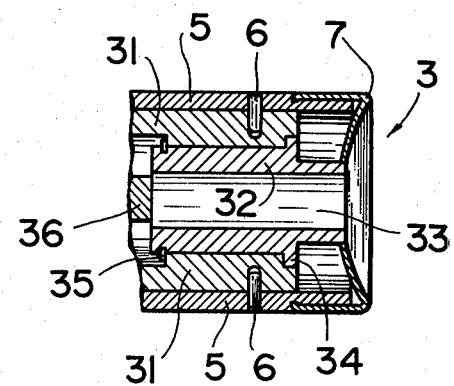
FIG. 3 is a sectional view across 3—3 of FIG. 1 showing a conventional cylinder lock.

Referring first to FIGS. 1 to 3, a conventional cylinder lock is first described, as commonly used in an automobile steering lock combined with an ignition switch. Steering locks are widely used in automobiles since an ignition switch as the sole anti-theft device is insufficient. The steering lock assembly shown in FIGS. 1 to 3 has only one cylinder which serves to fasten both the ignition switch and the steering lock. A hole 1 receives a steering shaft. A bolt 2 is thrust out by operation of cylinder lock 3 and inserted into a hole formed in a steering shaft (not shown) to prevent rotation of the shaft. Simultaneously operation of the cylinder lock actuates the ignition switch to shut off an electric power supply through wires 4. The cylinder lock 3 has a casing 5, to which an outer cylinder 31 is fastened by fast pins 6. An inner cylinder 32 has a keyhole 33 and is connected with the outer cylinder through tumbler pins so that the inner cylinder 32 is rotatable with respect to the outer cylinder 31 when a correct key is inserted into the keyhole. The inner cylinder 32 further has a flange 34 preventing inward movement of the inner cylinder, and a retaining ring 35 preventing extraction of the inner cylinder. At an inner most portion of inner cylinder 32, there is provided an actuating member 36 which is moved by rotational movement of the inner cylinder to actuate the steering lock and ignition switch. The outer end of casing 5 is covered by a cap 7.

In this construction, only ring 35 prevents extraction of inner cylinder 32 and is usually inadequate, especially since inner cylinder 32 is made of a relatively soft material such as zinc die-casting alloys. Cap 7 is also not strong enough to prevent cylinder extraction. Accordingly, if someone forcibly inserts a screw tap into the keyhole and interlocks it with the inner cylinder, application of an impact pulling force thereto usually breaks, retaining ring 35, allowing extraction of the inner cylinder and opening of the cylinder lock without a duplicate key. It is unfeasible to increase the strength of the retaining ring because of a restricted narrow space, and such is also the case with other retaining means such as a retaining pin.

Figure 4:
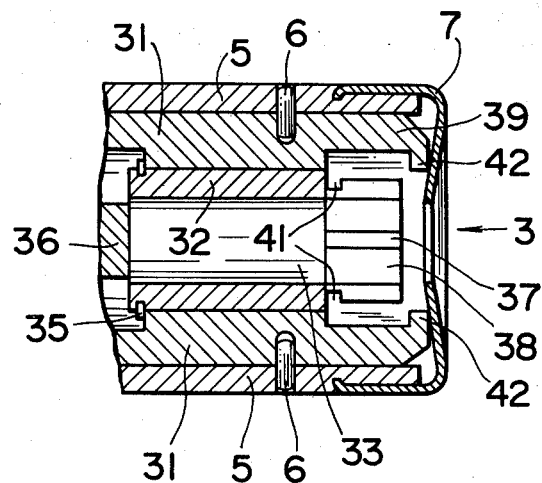
FIG. 4 is a sectional view similar to FIG. 3 showing an embodiment of the present invention.
Figure 5:
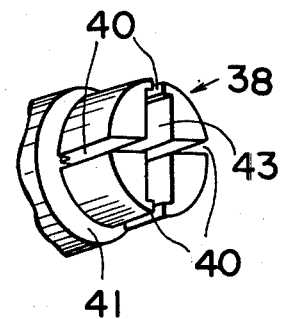
FIG. 5 is an enlarged perspective view showing a portion of FIG. 4.
Figure 6:
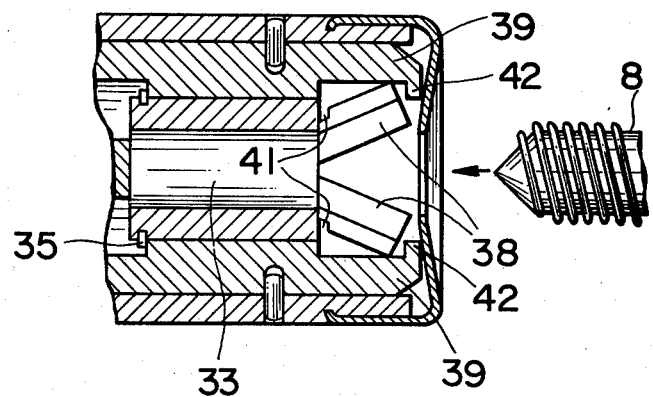
FIG. 6 is a sectional view similar to FIG. 4, showing the operation of the cylinder lock of FIG. 4.

In view of the above description, reference is now made to FIGS. 4 to 6, wherein a preferred embodiment of the cylinder lock according to the present invention is shown.

As shown in FIG. 4, there are provided, at the entrance 37 of the keyhole 33, a deformable portion 38 which can be deformed into a radially expanded form when an object different from a correct key is forcibly inserted, and, at a corresponding position of the outer cylinder 31, a stop portion 39 which comes into contact with the radially expanded deformable portion 38 when said inner cylinder 32 is pulled outwardly, preventing the inner cylinder from being extracted.

As shown in FIG. 5, deformable portion 38 of this embodiment has an insertion hole 43 and is divided into several small sections by a plurality of slits 40, so that the strength of the deformable portion is weakened. The deformable portion 38 is further weakened by a circumferential groove 41 formed at the base of the deformable portion. Stop portion 39 extends over deformable portion 38, and has, at the outmost end, an inward projection 42 having an angled section. The stop portion 39 is normally out of contact with the deformable portion 38.

If a screw tap 8 or other tool is forcibly inserted into keyhole 33 through insertion hole 43, deformable portion 38 deforms into radially expanded form, as shown in FIG. 6, due to slits 40 and the notch effect of groove 41. When the tap is interlocked with deformable portion 38 or inner cylinder 32 and a strong pulling force is applied, the front ends of the deformable portion collide against the inward projection 42 to prevent extraction of the inner cylinder, even if retaining ring 35 is broken.

The cylinder lock of the present invention works well in normal use just as a conventional cylinder lock. However, according to the present invention, there is provided, in addition to normal means for retaining the inner cylinder, means for preventing the inner cylinder from being extracted which comprises the deformable portion and the stop portion. Therefore, one must further break the deformable portion in order to break open the lock. Thus, the cylinder lock of the present invention provides an improved safety against theft with a simple construction without affecting the normal function of the cylinder lock.

What is claimed is:

1. A cylinder lock, comprising:
   an outer member having a bore,
   an inner cylinder means including an inner cylinder rotatably received in said bore, said inner cylinder having a keyhole and being rotatable within said outer member only when a correct key is inserted into said keyhole, and
   actuating means actuated by rotational movement of said inner cylinder to cause locking action of the cylinder lock,
   said inner cylinder including, at an entrance of said keyhole, a deformable portion having an insertion hole through which a key is insertable into said keyhole, said outer member including a stop portion having an inwardly projecting flange defining a limited opening, said deformable portion being deformable into radially expanded form when engaged by an object other than a correct key forcibly inserted into said keyhole through said insertion hole, said deformable portion in a deformed condition having an outer circumferential contour radially larger than said limited opening of said stop portion and located behind said inward flange within said bore to contact the flange and thereby prevent unauthorized extraction of said inner cylinder axially from said outer member.

2. A cylinder lock according to claim 1, wherein said deformable portion includes a plurality of slits extending radially outward from said insertion hole and axially from an outer end of said deformable portion to a predetermined depth so that said deformable portion is divided into axially extending plural sections circumferentially disposed around said insertion hole.

3. A cylinder lock according to claim 2, wherein said deformable portion is formed with a circumferential groove formed on the circumference of said deformable portion surrounding said insertion hole, said slits extending axially from said groove.

4. A cylinder lock according to claim 1, wherein said limited opening of said stop portion is aligned with the insertion hole and dimensioned to permit passage therethrough of said deformable portion when said deformable portion is in its normal, undeformed position.

* * * * *